US008535793B2

(12) United States Patent
Valette et al.

(10) Patent No.: US 8,535,793 B2
(45) Date of Patent: Sep. 17, 2013

(54) THERMOSETTING COMPOSITIONS COMPRISING SILICONE POLYETHERS, THEIR MANUFACTURE, AND USES

(75) Inventors: Ludovic Valette, Shanghai (CN); Patricia L. Roberts, Columbia, MO (US); Bernd Hoevel, Sinzheim (DE)

(73) Assignee: Dow Global Technologies LLC, Midland, MI (US)

( * ) Notice: Subject to any disclaimer, the term of this patent is extended or adjusted under 35 U.S.C. 154(b) by 415 days.

(21) Appl. No.: 12/808,727

(22) PCT Filed: Dec. 3, 2008

(86) PCT No.: PCT/US2008/085325
§ 371 (c)(1),
(2), (4) Date: Aug. 25, 2010

(87) PCT Pub. No.: WO2009/079205
PCT Pub. Date: Jun. 25, 2009

(65) Prior Publication Data
US 2010/0311891 A1    Dec. 9, 2010

Related U.S. Application Data

(60) Provisional application No. 61/014,560, filed on Dec. 18, 2007.

(51) Int. Cl.
*B32B 27/04* (2006.01)
*C08G 59/18* (2006.01)
*C08L 63/00* (2006.01)
*C08L 83/12* (2006.01)

(52) U.S. Cl.
USPC ......... 428/297.4; 523/440; 524/588; 525/476

(58) Field of Classification Search
USPC ............... 525/474, 476, 479, 523; 524/588; 523/440; 428/297.4, 413, 429
See application file for complete search history.

(56) References Cited

U.S. PATENT DOCUMENTS

| | | | | |
|---|---|---|---|---|
| 4,052,495 A * | 10/1977 | Uhlmann et al. | ............ | 264/216 |
| 4,546,154 A * | 10/1985 | Robertson | .................... | 525/474 |
| 5,064,881 A * | 11/1991 | Togashi et al. | ................ | 523/443 |
| 5,109,067 A * | 4/1992 | Dae et al. | ...................... | 525/101 |
| 5,373,035 A * | 12/1994 | Uemura et al. | ................ | 523/212 |
| 5,389,140 A * | 2/1995 | Yasuoka et al. | ............... | 106/428 |
| 5,468,432 A * | 11/1995 | Hurley et al. | ................. | 264/45.3 |
| 5,684,074 A * | 11/1997 | Hirashima et al. | ........... | 524/265 |
| 5,985,954 A | 11/1999 | Tsuchida et al. | | |
| 2002/0013420 A1 * | 1/2002 | Wang et al. | .................. | 525/406 |
| 2004/0014843 A1 | 1/2004 | Sumita et al. | | |
| 2004/0112631 A1 * | 6/2004 | Gotoh et al. | ................. | 174/250 |
| 2007/0031671 A1 * | 2/2007 | Mizusaki et al. | ............. | 428/375 |
| 2011/0009527 A1 * | 1/2011 | Hoevel et al. | ................ | 523/400 |

FOREIGN PATENT DOCUMENTS

| | | |
|---|---|---|
| DE | 10002726 | 8/2001 |
| EP | 1454962 | 8/2004 |
| JP | 01-108255 | 4/1989 |
| JP | 01-299816 | 4/1989 |
| JP | 09-286844 | 11/1997 |
| JP | 10101972 A * | 4/1998 |
| JP | 2000007887 | 1/2000 |
| JP | 2003336207 | 11/2003 |

OTHER PUBLICATIONS

Machine translation of JP 2000-007887 A, provided by the JPO website (no date).*
Partial translation of JP 2000-007887 A, provided by the USPTO translations unit (no date).*
Machine translation of JP 10101972 A, provided by the JPO website (no date).*
International Preliminary Report on Patentability from related PCT application PCT/US2008/085325, dated May 2, 2010, 8 pages.
Mizumoto, et al., XP002515765, Thomson Scientific, Jan. 3, 2000, vol. 2000, No. 13.

* cited by examiner

*Primary Examiner* — Michael J Feely
(74) *Attorney, Agent, or Firm* — Brooks, Camerson & Huebsch, PLLC

(57) ABSTRACT

Thermosetting compositions comprising (a) at least a first thermosetting resin, and (b) at least one silicone polyether, methods of making such thermosetting compositions, and thermoset products made from the compositions.

15 Claims, No Drawings

THERMOSETTING COMPOSITIONS COMPRISING SILICONE POLYETHERS, THEIR MANUFACTURE, AND USES

CROSS REFERENCE TO RELATED APPLICATIONS

This is a §371 application of PCT International Patent Application Number PCT/US2008/085325 filed Dec. 3, 2008, and claims priority from provisional application Ser. No. 61/014,560 filed Dec. 18, 2007, each of which is incorporated herein by reference in its entirety.

FIELD OF THE INVENTION

The present invention relates to thermosetting compositions comprising thermosetting resins and silicone polyethers.

BACKGROUND OF THE INVENTION

Some thermosetting compositions produce thermoset products having good toughness, some having good moisture resistance, and some having good processability. However, to date, a thermosetting composition producing a thermoset product exhibiting each of those characteristics, to the extent that it could be prepared in large scale, and used in high performance applications under significant stress and moisture exposure, has not been made.

The present invention seeks to solve these problems.

SUMMARY OF THE INVENTION

The present invention provides improved thermoset products exhibiting excellent mechanical performance and moisture resistance. The thermoset product exhibits improved toughness and reduced moisture uptake, while maintaining good processability.

The present invention provides at least the following advantages and features: combination of toughness and low viscosity; combination of toughness and water resistance; excellent mechanical properties, especially when used with a filler; possibility of grafting polymers into the thermoset network; and stable incorporation of silicone.

These features and advantages are provided at least by the following specific embodiments: A thermosetting composition including (a) at least a first thermosetting resin, and (b) at least one silicone polyether, wherein the silicone polyether comprises at least one of the following structures:

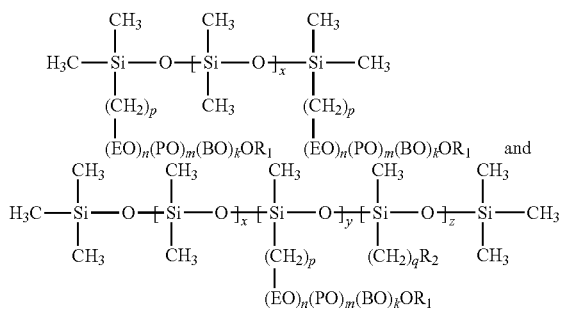

wherein x, y, z, p, q, k, m, and n may be independent integers; x and y may be greater than or equal to 1; z may be greater than or equal to 0; p and q may be greater than or equal to 1; k, n, and m may be greater than or equal to 0 and the sum of k+n+m may be greater than or equal to 1; $R_1$ and $R_2$ may be independent end groups chosen from H, $(CH_2)_rCH_3$ where r is an integer greater than or equal to 0, $OCH_3$, and (meth)acrylate; and EO is ethylene oxide, PO is propylene oxide, and BO is butylene oxide.

Other features and advantages of the present invention will be set forth in the description of the present invention that follows, and will be apparent, in part, from the description or may be learned by practice of the present invention. The present invention will be realized and attained by the compositions, products, and methods particularly pointed out in the written description and claims hereof.

DETAILED DESCRIPTION OF THE INVENTION

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

As noted above, some thermosetting resins are characterized as having good toughness, some as having good moisture resistance, and some having good processability. However, prior to the present invention, a thermosetting resin exhibiting each of those characteristics to the extent that it could be prepared in large scale, and used in high performance applications under significant stress and moisture exposure, had not been made. The present invention provides thermoset products improving on these characteristics. The present invention provides significant, and in some instances surprising, improvements over conventional thermoset networks.

For example, most conventional toughening agents, such as rubbers, core-shell particles, thermoplastic block polymers, have a high molecular weight to initiate suitable toughening mechanisms. The high molecular weight, however, has an undesirable effect on the viscosity of the uncured thermoset formulation. Because of the high viscosity, these formulations cannot be used to prepare compositions that need to diffuse into small cavities, and they also cannot be used with conventional processes (e.g., because of limitations of the pumps). To lower the viscosity of these conventional formulations, the processing temperature of the formulation is increased, but this also leads to shortened pot life. It is surprising that silicone polyether resins with low molecular weight and/or low viscosity, which impart greater processability, maintain excellent toughening properties.

The use of polyethylene oxide-containing block copolymer has been described as an effective toughener. The polyethylene oxide block acts as a compatibilizer with the epoxy formulation, while the second block is non-miscible, leading to a micro-phase separation. However, such a product is inherently limited by its poor thermal stability and its low water resistance. When combined in a thermoset network such as an epoxy network, the water uptake drastically increases, probably because of the highly hydrophilic character of the polyethylene oxide chain. It is surprising that the silicone polyether resins improve the water resistance of epoxy network, even when they contain polyethylene oxide chains.

According to the present invention, there is a possibility to graft the silicone polyether additive in the thermoset network through the reactive groups. Most of the conventional tougheners are not reactive—they are physically linked to the network (by entanglement) but not chemically bonded. Therefore, they can migrate through the network, especially at high temperature (which is referred to as "creeping"). In embodiments of the present invention, the silicone polyether can be reactive with the thermoset system and consequently be incorporated into the final network. Migration of the toughening agent is prevented, even at high temperature.

Still further, silicone resins are known to work as release agents or surfactants. In these applications, it is generally desired that they migrate to the surface. It is surprising that the silicone polyethers, as used in embodiments herein, remain well dispersed within the bulk of the thermoset network, without migrating to the surface.

When block polymers are conventionally used as toughening agents, a specific sequence of blocks is relied upon to enable proper phase separation. In the instant embodiments, it is surprising to see that the silicone polyether resins create suitable phase separation even if they are grafted, instead of having a block structure. The chemical composition, in addition to the physical structure, appear to be important to this advantage of the invention.

The improvements observed with the instant embodiments are believed to relate to the use of silicone polyethers, and more particularly, to the use of silicone polyethers having preferred structures, in the thermoset products. While not wishing to be bound by any particular theory of operation, it appears that the silicone polyethers act as toughening agents, reduce moisture uptake in the thermoset network, while maintaining low viscosity in the uncured composition because of low viscosity. The presence of the silicone polyethers, as used herein, imparts greater toughness and lower moisture uptake, as compared to thermoset networks lacking the silicone polyethers.

Still further, the instant uncured compositions exhibit lower viscosity than conventional uncured compositions using conventional toughening agents, leading to better processability and easier handling with the present invention. The lower viscosity of the silicone polyethers also enables higher load levels of filler, while maintaining high processability and mechanical properties, as compared to other toughening agents. The silicone polyethers in the thermoset networks of the invention enable an improved coefficient of thermal expansion and reduced shrinkage of cast formulations. The thermoset networks prepared according to the present invention are especially suitable for high performance applications, including, for example, electrical and electronics casting, potting, and encapsulation.

To provide context for the following detailed description, some definitions may be helpful. "Thermosetting compositions" are compositions that include elements that may be included and mixed together, or reacted, to form a "thermoset product." As some of the elements of a "thermosetting composition" may react with one or more of such elements, the original elements of a thermosetting composition may no longer be present in the final "thermoset product." A "thermoset product" will generally include a "thermoset network," which is descriptive of the structure formed by a "thermosetting resin," examples of which are well known in the art.

Thermosetting Compositions

The invention provides thermosetting compositions comprising (a) at least a first thermosetting resin, and (b) at least one silicone polyether, wherein the silicone polyether comprises at one of the following structures (I) and (II):

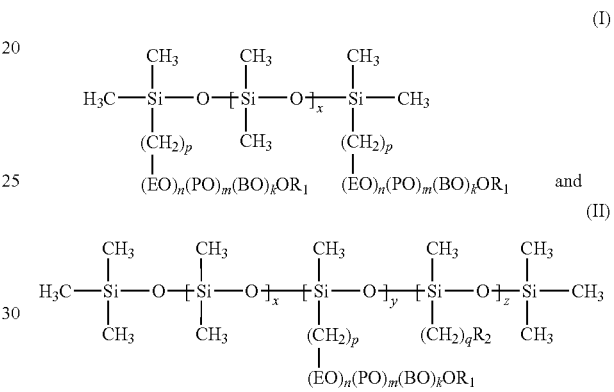

where EO is ethylene oxide, PO is propylene oxide, and BO is butylene oxide.

$R_1$ and $R_2$ may be independent end groups chosen, for example, from H, $(CH_2)_rCH_3$ where r is an integer greater than or equal to 0, $OCH_3$, or (meth)acrylate. In some embodiments, $R_1$ and $R_2$ may be independent end groups chosen from H, $OCH_3$, and $CH_3$.

The values of x, y, z, p, q, k, m, and n may be independent integers; x and y may be greater than or equal to 1; z may be greater than or equal to 0; p and q may be greater than or equal to 1; and k, n, and m may be greater than or equal to 0 and the sum of k+n+m may greater than or equal to 1. The value of z may range from 0 to 50, 0 to 45, 0 to 40, 0 to 35, 0 to 30, 0 to 25, 0 to 20, 0 to 15, 0 to 10, 0 to 5, and may be 0. The values of x and y may be independent integers and they may range from 1 to 2000, 2 to 1000, 5 to 800, 10 to 600, 20 to 400. Preferably the sum of x+y may range from 1 to 2000, 2 to 1000, 5 to 800, 10 to 600, 20 to 400. The values of p and q may be independent and range from 1 to 10, such as 1, 2, 3, 4, 5, 6, 7, 8, 9, or 10, and from any number to any number, such as, for example, from 2 to 7, or from 2 to 5; in some embodiments, both p and q are 3. The sum of n+m may be greater than or equal to 1 and k may be equal to 0.

The values of x, y, p, and q may be independently chosen such that the weight average molecular weight of the at least one silicone polyether is from about 400 to about 100,000, or about 600 to about 60,000, or from about 1,000 to about 50,000, or from about 2,000 to about 30,000. The values of x, y, p, and q may be independently chosen such that the percentage by weight of silicone backbone in the at least one silicone polyether is from about 5% to about 95%, or from about 10% to about 90%, or from about 15% to about 60%. The values of x, y, p, and q may be independently chosen such that the weight average molecular weight of the silicone backbone in the at least one silicone polyether is from about 200 to about 30,000, or from about 500 to about 15,000, or from about 700 to about 6,000.

The at least one silicone polyether is generally chosen such that its viscosity, when measured according to A.S.T.M. D445, at 25° C., is from about 1 cSt to about 50,000 cSt, or from about 5 cSt to about 10,000 cSt, or from about 10 cSt to about 6,000 cSt, or from about 20 cSt to about 4,000 cSt, or from about 100 cSt to about 3,000 cSt. The concentration of the at least one silicone polyether is generally from about 0.02 to about 30 wt %, or from about 0.05 to about 25 wt %, or from about 0.1 to about 20 wt %, or from about 0.2 to about 15 wt %, or from about 0.5 to about 12 wt %, or from about 1 to about 10 wt %, of the composition, excluding the weight of volatile components. The at least one silicone polyether is generally from about 0.05 to about 30 wt %, or from about 0.1 to about 25 wt %, or from about 0.2 to about 20 wt %, or from about 0.5 to about 15 wt %, or from about 1 to about 12 wt %, or from about 2 to about 10 wt %, of the composition, excluding the weight of any solvents, fillers, and fibers.

The first thermosetting resin may comprise a resin selected from epoxy resins, isocyanate resins, (meth)acrylic resins, phenolic resins, vinylic resins, styrenic resins, and polyester resins. The thermosetting composition of the invention may further comprise at least one hardener for the at least one thermosetting resin. Hardeners may be chosen from, but are not limited to, amines, phenolic resins, carboxylic acids, carboxylic anhydrides, and polyol resins. In embodiments wherein the first thermosetting resin comprises an epoxy resin, the at least one hardener is preferably chosen from amines, phenolic resins, carboxylic acids, and carboxylic anhydrides. In embodiments wherein the first thermosetting resin comprises an isocyanate, the at least one hardener is preferably chosen from polyols.

The thermosetting composition may further include at least one catalyst for polymerization, including homopolymerization, of the at least one thermosetting resin, or for a reaction between the at least one thermosetting resin and the at least one hardener. The thermosetting composition may further include a second thermosetting resin different from the first thermosetting resin and different from the at least one hardener. The thermosetting composition may further include at least one solvent. The thermosetting composition according to the invention may further include one or more additives chosen from toughening agents, curing inhibitors, wetting agents, colorants, thermoplastics, processing aids, dyes, UV-blocking compounds, and fluorescent compounds. This list is intended to be exemplary and not limiting.

The thermosetting composition may further include one or more fillers or fibrous reinforcements. Examples of such fillers include, but are not limited to, inorganic fillers, including, but not limited to, silica, talc, quartz, mica, aluminum hydroxide, magnesium hydroxide, and boehmite. The concentration of the filler, such as inorganic filler, may range from about 1 to about 95 wt %, or from about 2 to about 90 wt %, or from about 3 to about 80 wt %, or from about 5 to about 85 wt %, or from about 10 to about 80 wt %, or from about 15 to about 75 wt %, or from about 5 to about 70 wt %, or from about 10 to about 65 wt %, based on the total weight of the composition excluding the weight of volatiles. The average particle size of the inorganic filler will generally be less than about 1 mm, such as less than about 100 microns, or less than about 50 microns, or even less than about 10 microns. The average particle size of the inorganic filler will be greater than about 2 nm, or greater than about 10 nm, or greater than about 20 nm, or greater than about 50 nm.

Thermoset Products

Also provided by the present invention are thermoset products that may include (a) one or more thermoset networks, and (b) one or more silicone polyethers, wherein the silicone polyether comprises one or more of structures (I) and (II) shown above, where the variables have the meanings described above. The thermoset products can also include at least one filler or fibrous reinforcement.

The present thermoset products find use in any application in which a tough and highly moisture resistant network is desired. General applications include, for example, casting, potting, and encapsulation, and general products include coatings, composites, and laminates. Uses that are more specific include electrical or electronic casting, electrical or electronic potting, electrical or electronic encapsulation, and specific products include electrical laminates, structural composites, photo- and solder-resists, protective coatings, conformal coatings, decorative coatings, and resin-coated copper foils.

The following examples are illustrative of the present invention, and are not to be construed as limiting the scope of the present invention. Variations and equivalents of these examples will be apparent to those of skill in the art in light of the present disclosure. Unless otherwise stated, all percentages are by weight of the total composition.

EXAMPLES

Various terms, abbreviations and designations for the raw materials and tests used in the following Examples are explained as follows:

n.m. stands for "not measured."

EEW stands for epoxy equivalent weight (on solids).

AnhEW stands for anhydride equivalent weight (on solids).

Epoxy Resin E-1 is a diglycidyl ether of bisphenol A, EEW=180, viscosity=8500 mPa·s at 25° C.

Epoxy Resin E-2 is a diglycidyl ether of bisphenol F, EEW=176, viscosity=3900 mPa·s at 25° C.

Anhydride hardener A-1 is cyclohexane dicarboxylic anhydride, AnhEW=154, viscosity=80 mPa·s at 25° C.

Anhydride hardener A-2 is methyl hexahydrophthalic anhydride, AnhEW=178, viscosity=55 mPa·s at 25° C.

DEG stands for diethylene glycol.

1MI stands for 1-methyl imidazole.

1B2PI stands for 1-benzyl-2-phenyl imidazole.

SBM-1 is a styrene-butadiene-methyl methacrylate block polymer, known in the prior art as an effective toughening agent for thermosets and considered as a low molecular weight polymer in this context (the average molecular weight is about 40000).

SPE-1 is a silicone polyether resin according to Structure (II), where p=3, m=0, k=0, z=0, $R_1$=H, and x, y, and n such as the average molecular weight is about 2300, the silicone content is about 47%, the EO content is about 53%, and the viscosity is about 400 cSt at 25° C.

SPE-2 is a silicone polyether resin according to Structure (II), where p=3, k=0, z=0, $R_1$=H, and x, y, m, and n such as the average molecular weight is about 27900, the silicone content is about 18%, the EO content is about 35%, the PO content is about 47%, and the viscosity is about 2300 cSt at 25° C.

SPE-3 is a silicone polyether resin according to Structure (II), where p=3, k=0, z=0, $R_1$=$OCH_3$, and x, y, m, and n such as the average molecular weight is about 28300, the silicone content is about 18%, the EO content is about 35%, the PO content is about 47%, and the viscosity is about 2000 cSt at 25° C.

SPE-4 is a silicone polyether resin according to Structure (II), where p=3, m=0, k=0, z=0, $R_1$=OCH$_3$, and x, y, and n such as the average molecular weight is about 3100, the silicone content is about 53%, the EO content is about 47%, and the viscosity is about 280 cSt at 25° C.

SPE-5 is a silicone polyether resin according to Structure (II), where p=3, n=0, k=0, z=0, $R_1$=H, and x, y, and m such as the average molecular weight is about 6100, the silicone content is about 87%, the PO content is about 13%, and the viscosity was about 170 cSt at 25° C.

SPE-6 is a silicone polyether resin according to Structure (I), where p=3, m=0, k=0, $R_1$=H, and x and n such as the average molecular weight is about 2200, the silicone content is about 48%, the EO content is about 52%, and the viscosity was about 310 cSt at 25° C.

SPE-7 is a silicone polyether resin according to Structure (I), where p=3, m=0, k=0, x=1, n=4, $R_1$=H. The average molecular weight is about 650, the silicone content is about 32%, the EO content is about 68%, and the viscosity was about 41 cSt at 25° C.

SPE-8 is a silicone polyether resin according to Structure (I), where p=3, m=0, k=0, x=1, n=4, $R_1$=OCH$_3$. The average molecular weight is about 700, the silicone content is about 29%, the EO content is about 71%, and the viscosity was about 28 cSt at 25° C.

Filler F—Si is a silica flour (composition such as SiO$_2$=99.2%), with a median particles size D50=3 micron, a specific surface=4.2 m$^2$/g (determined by Brunauer, Emmett, and Teller, i.e., BET method).

The moisture uptake was measured at 25° C. Specimens (about 50×10×3 mm) were cut in clear castings are exactly weighted (W1). The specimens were placed in a distilled water bath for 24 h or 1 week. They were then removed from the water bath. Within 5 minutes, the surface of the specimens was carefully dried with a paper towel to remove surface water and the specimens were exactly weighted again (W2). The moisture uptake was calculated with the following formula:

moisture uptake=(W2−W1)/W1

The reproducibility of the method was estimated to be less than ±10%.

The thermoset product of the present invention exhibits a water uptake of less than about 0.13, or of less than about 0.10, or of less than about 0.8, wherein water uptake is measured by cutting a 50×10×3 mm specimen of the thermoset product, weighing the specimen to obtain a weight W1, placing the specimen in a distilled water bath for 24 hours, removing the specimen from the water bath, drying the surface of specimen within 5 minutes with a paper towel to remove surface water, weighing the specimen again to obtain a weight W2, and calculating the water uptake using the following formula:

water uptake=(W2−W1)/W1.

The hardness of the clear casting was measured at 25° C. with a Shore D durometer in accordance with DIN 53505. The specimen was placed on a hard, horizontal surface. The durometer was held in a vertical position with the point of the indentor at least 12 mm from any edge of the specimen. The durometer foot was applied to the specimen as rapidly as possible without shock, keeping the foot parallel to the surface of the specimen. Just sufficient pressure was applied to obtain firm contact between the foot and the specimen. The reported Shore D values were an average of at least 3 measurements. The reproducibility of the method was estimated to be about ±3 units.

The glass transition temperature Tα was reported as the transition peak temperature in the tan δ plot measured by dynamic thermo-mechanical analysis (DMTA) at a frequency of 1 Hz. The heating ramp consisted in 3° C. increase steps followed by 20 s dwell time. The reproducibility of the method was estimated to be about ±3° C.

The plane-strain fracture toughness $K_{Ic}$ was measured at 25° C. according to the ASTM D5045 method. The measurement was performed at ambient temperature. The reported $K_{Ic}$ values were an average of at least 5 measurements. The reproducibility of the method was estimated to be about ±0.07 MPa·m$^{0.5}$.

The thermoset product according to the present invention exhibits a toughness, $K_{Ic}$, as measured according to ASTM D5045 method, of greater than about 0.7 MPa·m$^{0.5}$ or of greater than about 0.9 MPa·m$^{0.5}$ of greater than about 1.1 MPa·m$^{0.5}$.

The determination of the cone and plate viscosity of the formulations was measured in accordance with A.S.T.M. D 4287-00. The measurements were performed at 25° C. The reproducibility of the method was estimated to be less than ±5%.

Tensile properties (tensile modulus, tensile stress, and tensile elongation at break) were measured at 25° C. in accordance with ISO 527. Flexural properties (flexural modulus and flexural stress) were measured at 25° C. in accordance with ISO 178.

Preparation of Clear Casting

Formulations were prepared by blending the individual resins, the optional additives, and catalyst components in suitable solvents at ambient temperature and mixing the solutions. When the viscosity of the formulations was too high to be handled at ambient temperature, formulations were warmed up at 60-80° C. to lower the viscosity. The formulations were degassed under vacuum for 15 minutes. Castings were prepared by pouring the formulations in open molds. Except mentioned otherwise, castings were cured in a ventilated oven at 120° C. for 2 hours (h) followed by a post-cure at 160° C. for 2 h. Castings were slowly cooled down to ambient temperature in about 60 minutes.

Examples 1 to 6 and Comparative Example A

Formulations containing different concentrations of silicone polyether and the respective clear castings were prepared according to the general procedure. The composition of the formulations and the properties of the clear castings are shown in the following Table I.

TABLE I

| | Example | | | | | | |
|---|---|---|---|---|---|---|---|
| | Comparative Example A | Example 1 | Example 2 | Example 3 | Example 4 | Example 5 | Example 6 |
| Composition of the formulations (g) | | | | | | | |
| Epoxy resin E-1 | 100 | 100 | 100 | 100 | 100 | 100 | 100 |
| Anhydride hardener A-1 | 85 | 85 | 85 | 85 | 85 | 85 | 85 |

TABLE I-continued

| | Comparative Example A | Example 1 | Example 2 | Example 3 | Example 4 | Example 5 | Example 6 |
|---|---|---|---|---|---|---|---|
| 1B2PI | 0.5 | 0.5 | 0.5 | 0.5 | 0.5 | 0.5 | 0.5 |
| Silicone polyether SPE-1 | 0 | 1 | 2.5 | 5 | 15 | 30 | 50 |
| Properties of the clear castings | | | | | | | |
| Concentration of silicone polyether SPE-1 (wt %) | 0 | 0.5 | 1.3 | 2.6 | 7.5 | 13.9 | 21.1 |
| Appearance | transparent | opalescent | opaque | opaque | transparent | transparent | transparent |
| Tα, DMTA (° C.) | 148 | 145 | 145 | 145 | 133 | 124 | 107 |
| $K_{Ic}$ (MPa·m$^{0.5}$) | 0.58 | 0.62 | 0.79 | 0.83 | 1.27 | 1.46 | 1.91 |
| Modulus, tensile/flexural (GPa) | 3.1/3.0 | n.m. | n.m. | 3.0/3.2 | 2.9/2.9 | 2.5/2.4 | n.m. |
| Elongation at break, tensile (%) | 5.8 | n.m. | n.m. | 5.9 | 5.6 | 4.9 | n.m. |
| Stress, tensile/flexural (MPa) | 84/118 | n.m. | n.m. | 80/123 | 68/108 | 53/90 | n.m. |
| Water uptake, 1 day/1 week @25° C. (%) | 0.15/0.25 | 0.05/0.15 | 0.05/0.14 | 0.05/0.16 | 0.08/0.19 | 0.11/0.26 | 0.40/0.70 |
| Hardness, shore D | 83 | 90 | 86 | 86 | 85 | 78 | 70 |

Depending on the concentration of silicone polyether, the resulting thermoset network remained transparent or turned into opalescent or opaque. However all castings presented in these examples were visually homogeneous, i.e., they did not display macroscopic phase separation.

The casting presented in Example 3 showed improved toughness demonstrated by the 36% increase of $K_{Ic}$ when compared to the casting presented in Comparative Example A, while showing enhanced moisture resistance as measured by the water uptake (−67% and −36% after 1 day and 1 week respectively, when compared to Comparative Example A). The other thermo-mechanical properties were unchanged, within the experimental errors.

The casting presented in Example 4 showed a large improvement of toughness demonstrated by the 119% increase of $K_{Ic}$ when compared to the casting presented in Comparative Example A, while showing enhanced moisture resistance as measured by the water uptake (−47% and −24% after 1 day and 1 week respectively, when compared to Comparative Example A).

Within the range of tested concentration, higher concentration of silicone polyether led to higher toughness, shown by an increase of $K_{Ic}$.

When the concentration of silicone polyether is too high, thermo-mechanical properties and water resistance are negatively impacted, as shown in Example 6. This example illustrated that the concentration of silicone polyether in the composition can be adjusted to maximize the desired physical characteristics of the end product.

Examples 7 to 10

Formulations containing different types of silicone polyether and the respective clear castings were prepared according to the general procedure. The composition of the formulations and the properties of the clear castings are shown in the following Table II.

TABLE II

| | Comparative Example A | Example 7 | Example 8 | Example 9 | Example 10 |
|---|---|---|---|---|---|
| Composition of the formulations (g) | | | | | |
| Epoxy resin E-1 | 100 | 100 | 100 | 100 | 100 |
| Anhydride hardener A-1 | 85 | 85 | 85 | 85 | 85 |
| 1B2PI | 0.5 | 0.5 | 0.5 | 0.5 | 0.5 |
| Silicone polyether SPE-2 | | 5 | | | |
| Silicone polyether SPE-3 | | | 5 | | |
| Silicone polyether SPE-4 | | | | 5 | |
| Silicone polyether SPE-5 | | | | | 5 |
| Properties of the clear castings | | | | | |
| Concentration of silicone polyether (wt %) | 0 | 2.6 | 2.6 | 2.6 | 2.6 |

TABLE II-continued

| | Comparative Example A | Example 7 | Example 8 | Example 9 | Example 10 |
|---|---|---|---|---|---|
| Appearance | transparent | transparent | opaque | opaque macroscopic phase separation | opaque macroscopic phase separation |
| $T\alpha$, DMTA (° C.) | 148 | 145 | 151 | n.m. | n.m. |
| Water uptake, 1 day @25° C. (%) | 0.15 | 0.06 | 0.05 | n.m. | n.m. |
| Hardness, shore D | 83 | 83 | 83 | n.m. | n.m. |

Regardless of the fact of being transparent or opaque, Examples 7 and 8 showed a large improvement in moisture resistance compared to Comparative Example A, as measured by the water uptake (−56% and −67% respectively), while maintaining similar thermo-mechanical properties. It was hypothesized that the structure of the silicone polyether could control the visual appearance of the clear castings by changing the compatibility with the thermoset network. It appeared that the transparent sample showed lower $T\alpha$, possibly because of higher flexibilization of the thermoset network due to the better compatibility of the silicone polyether with the thermoset network.

Examples 9 and 10 resulted in inhomogeneous, phase-separated clear casting. It is believed that the molecular structure of the silicone polyether SPE-4 and SPE-5 were not compatible enough with the epoxy/anhydride network. This example illustrated that the molecular structure of silicone polyether in the composition can be modified to maximize the desired physical characteristics of the end product.

Examples 11 to 14

Formulations containing different types of silicone polyether and the respective clear castings were prepared according to the general procedure. The composition of the formulations and the properties of the clear castings are shown in the following Table III.

TABLE III

| | Comparative Example A | Example 11 | Example 12 | Example 13 | Example 14 |
|---|---|---|---|---|---|
| Composition of the formulations (g) | | | | | |
| Epoxy resin E-1 | 100 | 100 | 100 | 100 | 100 |
| Anhydride hardener A-1 | 85 | 85 | 85 | 85 | 85 |
| 1B2PI | 0.5 | 0.5 | 0.5 | 0.5 | 0.5 |
| Silicone polyether SPE-2 | | 15 | | | |
| Silicone polyether SPE-3 | | | 15 | | |
| Silicone polyether SPE-4 | | | | 15 | |
| Silicone polyether SPE-5 | | | | | 15 |
| Properties of the clear castings | | | | | |
| Concentration of silicone polyether (wt %) | 0 | 7.5 | 7.5 | 7.5 | 7.5 |
| Appearance | transparent | transparent | opaque | opaque macroscopic phase separation | opaque macroscopic phase separation |
| $T\alpha$, DMTA (° C.) | 148 | 142 | 148 | n.m. | n.m. |
| Water uptake, 1 day @25° C. (%) | 0.15 | 0.10 | 0.07 | n.m. | n.m. |
| Hardness, shore D | 83 | 82 | 80 | n.m. | n.m. |
| $K_{Ic}$ (MPa·m$^{0.5}$) | 0.58 | 1.54 | 1.23 | n.m. | n.m. |

Regardless of the fact of being transparent or opaque, Examples 11 and 12 showed a large improvement in moisture resistance compared to Comparative Example A, as measured by the water uptake (−33%, and −53% respectively), while maintaining similar thermo-mechanical properties. It was hypothesized that the structure of the silicone polyether could control the visual appearance of the clear castings by changing the compatibility with the thermoset network. It appeared that the transparent sample showed lower $T\alpha$, possibly because of higher flexibilization of the thermoset network due to the better compatibility of the silicone polyether with the thermoset network.

Examples 13 and 14 resulted in inhomogeneous, phase-separated clear casting. It is believed that the molecular structure of the silicone polyether SPE-4 and SPE-5 were not compatible enough with the epoxy/anhydride network. This example also illustrated that the molecular structure of silicone polyether in the composition can be adjusted to maximize the desired physical characteristics of the end product.

Examples 11 and 12 showed a significant improvement in toughness as measured by $K_{Ic}$ when compared to Comparative Example A (+166% and +112%, respectively).

Examples 15 to 19 and Comparative Example B

Formulations containing different types of silicone polyether and the respective clear castings were prepared according to the general procedure. The composition of the formulations and the properties of the clear castings are shown in the following Table IV.

stress were reduced whereas the elongation at break was increased. Consequently, we believe that Example 17 will show improved crack resistance when compared to Comparative Example B while maintaining similar thermal class ranking.

The resulting castings from Example 18 and Example 19 were opaque but they remained visually homogeneous, i.e. they did not display macroscopic phase separation, unlike Example 13 and Example 14 (same composition without silica filler). Nonetheless, Example 18 showed reduced toughness when compared to Comparative Example B, probably due to the poor compatibility of the silicone polyether SPE-4. This example also illustrated that the molecular structure of silicone polyether in the composition can be adjusted to maximize the desired physical characteristics of the end product.

Example 19 maintained the thermo-mechanical properties of Comparative Example B, but reduced the moisture resis-

TABLE IV

| | Example | | | | | |
|---|---|---|---|---|---|---|
| | Comparative Example B | Example 15 | Example 16 | Example 17 | Example 18 | Example 19 |
| Composition of the formulations (g) | | | | | | |
| Epoxy resin E-1 | 100 | 100 | 100 | 100 | 100 | 100 |
| Anhydride hardener A-1 | 85 | 85 | 85 | 85 | 85 | 85 |
| 1B2PI | 0.5 | 0.5 | 0.5 | 0.5 | 0.5 | 0.5 |
| Silicone polyether SPE-1 | | 15 | | | | |
| Silicone polyether SPE-2 | | | 15 | | | |
| Silicone polyether SPE-3 | | | | 15 | | |
| Silicone polyether SPE-4 | | | | | 15 | |
| Silicone polyether SPE-5 | | | | | | 15 |
| Filler F-Si | 200 | 200 | 200 | 200 | 200 | 200 |
| Properties of the clear castings | | | | | | |
| Concentration of silicone polyether (wt %) | 0 | 3.7 | 3.7 | 3.7 | 3.7 | 3.7 |
| Concentration of silicone polyether, excluding filler (wt %) | 0 | 7.5 | 7.5 | 7.5 | 7.5 | 7.5 |
| Appearance | opalescent | opalescent | opalescent | opaque | opaque | opaque |
| Tα, DMTA (° C.) | 148 | 133 | 139 | 145 | 142 | 148 |
| Water uptake, 1 day @25° C. (%) | 0.08 | 0.03 | 0.03 | 0.04 | 0.04 | 0.21 |
| Hardness, shore D | 92 | 85 | 90 | 89 | 91 | 91 |
| $K_{Ic}$ (MPa · m$^{0.5}$) | 1.23 | n.m. | 1.52 | 1.47 | 0.88 | n.m. |
| Modulus, tensile/flexural (GPa) | 9.1/8.2 | n.m. | n.m. | 6.9/6.8 | n.m. | n.m. |
| Elongation at break, tensile/flexural (%) | 1.7/2.4 | n.m. | n.m. | 2.1/3.4 | n.m. | n.m. |
| Stress, tensile/flexural (MPa) | 85/146 | n.m. | n.m. | 72/131 | n.m. | n.m. |

Examples 15 to 18 showed a large improvement in moisture resistance compared to Comparative Example B, as measured by the water uptake (−63% for Examples 15 and 16, and −50% for Examples 17 and 18).

Examples 16 and 17 showed a significant improvement in toughness as measured by $K_{Ic}$ when compared to Comparative Example B (+24% and +20%, respectively). Although the thermal stability measured by Tα of Example 17 was almost unchanged when compared to Comparative Example B, the resulting network was more flexible. Modulus and ultimate tance, as measured by the water uptake (+163%). This example also illustrated that the molecular structure of silicone polyether in the composition can be adjusted to maximize the desired physical characteristics of the end product.

Examples 20 to 22 and Comparative Examples C to H

Formulations containing different toughening agents were prepared according to the general procedure, except for Comparative Examples D, F, and H. In these latter cases, the styrene-butadiene-methyl methacrylate SBM-1 polymer was not soluble in the epoxy resin E-1 neither at 25° C. nor at 80° C. The polymer SBM-1 had to be dissolved in the epoxy resin E-1 at 160° C. with mixing during about 1 h in order to obtain a homogeneous mixture.

The composition of the formulations and their respective viscosities are shown in the following Tables V-VII.

TABLE V

| | Examples | | |
|---|---|---|---|
| | Comparative Example C | Comparative Example D | Example 20 |
| Composition of the formulations (g) | | | |
| Epoxy resin E-1 | 100 | 100 | 100 |
| Styrene-Butadiene-Methyl Methacrylate polymer SBM-1 | 0 | 15 | 0 |
| Silicone polyether SPE-1 | 0 | 0 | 15 |
| Viscosity of the formulations | | | |
| Cone and plate viscosity measured at 25° C. (Pa · s) | 8.48 | 66.56 | 5.44 |

TABLE VI

| | Examples | | |
|---|---|---|---|
| | Comparative Example E | Comparative Example F | Example 21 |
| Composition of the formulations (g) | | | |
| Epoxy resin E-1 | 100 | 100 | 100 |
| Anhydride hardener A-1 | 85 | 85 | 85 |
| 1B2PI | 0.5 | 0.5 | 0.5 |
| Styrene-Butadiene-Methyl Methacrylate polymer SBM-1 | 0 | 15 | 0 |
| Silicone polyether SPE-1 | 0 | 0 | 15 |
| Viscosity of the formulations | | | |
| Cone and plate viscosity measured at 25° C. (Pa · s) | 0.64 | 3.60 | 0.40 |

TABLE VII

| | Examples | | |
|---|---|---|---|
| | Comparative Example G | Comparative Example H | Example 22 |
| Composition of the formulations (g) | | | |
| Epoxy resin E-1 | 100 | 100 | 100 |
| Anhydride hardener A-1 | 85 | 85 | 85 |
| 1B2PI | 0.5 | 0.5 | 0.5 |
| Styrene-Butadiene-Methyl Methacrylate polymer SBM-1 | 0 | 15 | 0 |
| Silicone polyether SPE-1 | 0 | 0 | 15 |
| Filler F-Si | 100 | 100 | 100 |
| Viscosity of the formulations | | | |
| Cone and plate viscosity measured at 25° C. (Pa · s) | 2.12 | 15.36 | 1.76 |

The processing advantage of using a silicone polyether toughening agent instead of a conventional block polymer toughening agent was obvious when comparing the viscosity of Examples 20, 21, and 22 with the respective Comparative Examples D, F, and H. The SBM-1 polymer must be pre-dissolved in the epoxy resin at high temperature in a preliminary step, resulting in higher cost and longer cycle time. Because conventional pumps show limitations in high-pressure handling, viscosity higher than about 20 Pa·s, as it was the case for Comparative Example D, is generally considered not suitable for raw materials. To ensure proper filling of voids during encapsulation, viscosity higher than about 5 Pa·s, as it was the case for Comparative Example H, is generally considered not suitable for fully formulated compositions.

The use of a silicone polyether resin is also advantageous over the reference formulation. Indeed the lower viscosity could enable better filling of voids during encapsulation, for given filler content. Alternatively, it could be possible to increase the filler content while maintaining similar viscosity of the fully formulated composition. Higher filler content could be suitable to reduce the coefficient of thermal expansion of the encapsulant.

Examples 23 to 25 and Comparative Examples I to K

Formulations containing different concentrations of silica filler were prepared according to the general procedure, with or without silicone polyether resin.

The flow characteristics were determined for each formulation using the following procedure. About 20 g of formulation were prepared and poured at 25° C. in the middle of an aluminum cup (diameter=8 cm). The preparations were degassed in a vacuum chamber at 80° C. for 15 min. Then they were cured in a ventilated oven according to the following cure schedule: 50 min at 75° C.+80 min at 115° C.+60 min at 150° C. The appearance of the cured castings in the aluminum cup was finally reported.

The composition of the formulations and their respective flow characteristics are shown in the following Tables VIII-IX.

TABLE VIII

| Examples | Example 23 | Example 24 | Example 25 |
|---|---|---|---|
| Composition of the formulations (g) | | | |
| Epoxy resin E-2 | 100 | 100 | 100 |
| Anhydride hardener A-2 | 97 | 97 | 97 |
| DEC | 2 | 2 | 2 |
| 1MI | 1 | 1 | 1 |
| Silicone polyether SPE-2 | 16 | 16 | 16 |
| Filler F-Si | 324 | 401 | 504 |
| Properties of the clear castings | | | |
| Concentration of silica filler (wt %) | 60 | 65 | 70 |
| Concentration of silicone polyether (wt %) | 3.0 | 2.6 | 2.2 |
| Flow characteristics of the formulations | Uniform wetting of the aluminum cup | Uniform wetting of the aluminum cup | Partial wetting of the aluminum cup (about 90% of the surface covered) |

TABLE IX

| | Examples | | |
|---|---|---|---|
| | Comparative Example I | Comparative Example J | Comparative Example K |
| Composition of the formulations (g) | | | |
| Epoxy resin E-2 | 100 | 100 | 100 |
| Anhydride hardener A-2 | 97 | 97 | 97 |
| DEC | 2 | 2 | 2 |
| 1MI | 1 | 1 | 1 |
| Silicone polyether SPE-2 | 16 | 16 | 16 |
| Filler F-Si | 300 | 371 | 467 |
| Properties of the clear castings | | | |
| Concentration of silica filler (wt %) | 60 | 65 | 70 |
| Concentration of silicone polyether (wt %) | 0 | 0 | 0 |
| Flow characteristics of the formulations | Partial wetting of the aluminum cup (about 80% of the surface covered) | Partial wetting of the aluminum cup (about 70% of the surface covered) | Partial wetting of the aluminum cup (no flow, about 50% of the surface covered) |

The processing advantage of using a silicone polyether resin was obvious when comparing the viscosity of Examples 23, 24, and 25 with the respective Comparative Examples I, J, and K containing the same filler concentration. The formulations containing a silicone polyether resin showed more suitable flow characteristics. At 60% or 65% filler loading, the cured casting of Examples 23 and 24 uniformly covered the aluminum cup, whereas the Comparative Examples I and J only partially covered the cup. At 70% filler loading, the cured casting of Example 25 showed an extensive flow although partial wetting of the cup, whereas Comparative Example K showed no flow at all.

The more uniform flow of the formulations containing silicone polyether resin could enable better filling of voids during encapsulation, for given filler content. Alternatively, it could be possible to increase the filler content while maintaining similar viscosity of the fully formulated composition. Higher filler content could be suitable to reduce the coefficient of thermal expansion of the encapsulant.

Examples 26 to 28

Formulations containing different types of silicone polyether and the respective clear castings were prepared according to the general procedure. The composition of the formulations and the properties of the clear castings are shown in the following Table X.

TABLE X

| | Example | | | |
|---|---|---|---|---|
| | Comparative Example A | Example 26 | Example 27 | Example 28 |
| Composition of the formulations (g) | | | | |
| Epoxy resin E-1 | 100 | 100 | 100 | 100 |
| Anhydride hardener A-1 | 85 | 85 | 85 | 85 |
| 1B2PI | 0.5 | 0.5 | 0.5 | 0.5 |
| Silicone polyether SPE-6 | | 15 | | |
| Silicone polyether SPE-7 | | | 15 | |
| Silicone polyether SPE-8 | | | | 15 |
| Properties of the clear castings | | | | |
| Concentration of silicone polyether (wt %) | 0 | 7.5 | 7.5 | 7.5 |
| Appearance | transparent | transparent | transparent | transparent |
| T$\alpha$, DMTA (° C.) | 148 | 133 | 124 | 124 |
| Water uptake, 1 day @25° C. (%) | 0.15 | 0.14 | 0.15 | 0.13 |
| Hardness, shore D | 83 | 85 | 85 | 86 |
| $K_{Ic}$ (MPa · m$^{0.5}$) | 0.58 | 1.17 | 0.62 | 0.68 |

Example 26 showed a large improvement in toughness as measured by $K_{Ic}$ compared to Comparative Example A (+102%), while maintaining similar hardness and moisture resistance as measured by water uptake. The thermal stability measured by Tα was significantly reduced when compared to Comparative Example A, possibly because of flexibilization of the thermoset network due to some compatibility of the silicone polyether with the thermoset network. SPE-6 is a silicone polyether according to Structure (I) whereas SPE-1 is a silicone polyether according to Structure (II). SPE-1 and SPE-6 have similar average molecular weight, silicone content, EO content, and viscosity. The comparison of Example 4 and Example 26 showed the influence of the structure of the silicone polyether on the performances of the clear casting. It was surprising that the grafted structure of SPE-1 gave similar or better properties than the block structure of SPE-6. This example illustrated that the molecular structure of silicone polyether in the composition can be adjusted to maximize the desired physical characteristics of the end product.

Examples 27 and 28 showed marginal improvement in toughness as measured by $K_{Ic}$ when compared with Comparative Example A (respectively +7% and +17%), while maintaining similar water uptake and hardness. The thermal stability measured by Tα was significantly reduced when compared to Comparative Example A, possibly because of flexibilization of the thermoset network due to some compatibility of the silicone polyether with the thermoset network. These examples illustrated that the molecular structure of silicone polyether in the composition can be adjusted to maximize the desired physical characteristics of the end product.

Although the present invention has been described in considerable detail with regard to certain versions thereof, other versions are possible, and alterations, permutations, and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the present invention or any embodiments thereof.

What is claimed is:

1. A thermosetting composition comprising (a) at least a first thermosetting resin comprising an epoxy resin, (b) at least one silicone polyether, wherein the silicone polyether comprises the following structure:

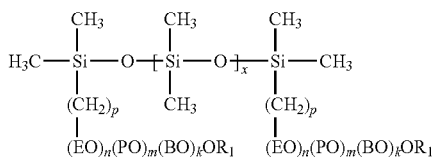

wherein x, p, k, m, and n are independent integers; x is greater than or equal to 1; p is greater than or equal to 1; k, n, and m are greater than or equal to 0 and the sum of k+n+m is greater than or equal to 1; $R_1$ is an independent end group chosen from H, $(CH_2)_rCH_3$ where r is an integer greater than or equal to 0, and (meth)acrylate, wherein the (meth)acrylate is C(O)CH=CH$_2$ or C(O)C(CH$_3$)=CH$_2$; and EO is ethylene oxide, PO is propylene oxide, and BO is butylene oxide; (c) at least one hardener for the at least one thermosetting resin; and (d) optionally a filler.

2. The thermosetting composition according to claim 1, further comprising at least one catalyst.

3. The thermosetting composition according to claim 1, wherein $R_1$ is an independent end group chosen from H, and $CH_3$.

4. The thermosetting composition according to claim 1, wherein x and p are independently chosen such that the weight average molecular weight of the at least one silicone polyether is from about 400 to about 100,000 at 25° C.; wherein x and p, are independently chosen such that the percentage by weight of silicone backbone in the at least one silicone polyether is from about 5% to about 95%; or wherein x and p are independently chosen such that the weight average molecular weight of the silicone backbone in the at least one silicone polyether is from about 200 to about 30,000 at 25° C.

5. The thermosetting composition according to claim 1, wherein the viscosity of the at least one silicone polyether, when measured at 25° C., is from about 1 cSt to about 50,000 cSt.

6. The thermosetting composition according to claim 1, wherein the concentration of the at least one silicone polyether is from about 0.02 to about 30 wt % of the composition.

7. The thermosetting composition according to claim 1, wherein the concentration of the at least one silicone polyether is from about 0.05 to about 30 wt % of the composition, excluding the weight of any filler.

8. The thermosetting composition according to claim 1, wherein the filler is an inorganic filler.

9. The thermosetting composition according to claim 8, wherein the concentration of the inorganic filler is from about 1 to about 95 wt % based on the total weight of the composition.

10. The thermosetting composition according to claim 8, wherein the average particle size of the inorganic filler is greater than about 2 nm and less than about 1 mm.

11. A thermoset product comprising a cured product of a thermosetting composition comprising: (a) at least one thermosetting resin comprising an epoxy resin; (b) at least one silicone polyether, wherein the silicone polyether comprises the following structure:

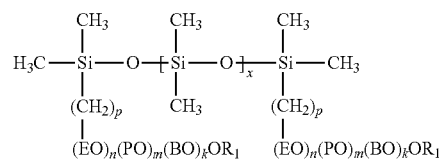

wherein x, p, k, m, and n are independent integers; x is greater than or equal to 1; p is greater than or equal to 1; k, n, and m are greater than or equal to 0 and the sum of k+n+m is greater than or equal to 1; $R_1$ is an independent end group chosen from H, $(CH_2)_rCH_3$ where r is an integer greater than or equal to 0, and (meth)acrylate, wherein the (meth)acrylate is C(O)CH=CH$_2$ or C(O)C(CH$_3$)=CH$_2$; and EO is ethylene oxide, PO is propylene oxide, and BO is butylene oxide; (c) at least one hardener for the at least one thermosetting resin; and (d) optionally a filler.

12. The thermoset product according to claim 11, wherein the product exhibits a toughness, $K_{Ic}$, as measured according to ASTM D5045 method, of greater than about $0.7\ MPa\cdot m^{0.5}$.

13. The thermoset product according to claim 11, wherein the product exhibits a water uptake of less than about 0.13, wherein water uptake is measured by cutting a 50×10×3 mm specimen of the thermoset product, weighing the specimen to obtain a weight W1, placing the specimen in a distilled water bath for 24 hours, removing the specimen from the water bath, drying the surface of specimen within 5 minutes with a paper towel to remove surface water, weighing the specimen again to obtain a weight W2, and calculating the water uptake using the following formula: water uptake=(W2−W1)/W1.

14. The thermoset product according to claim 11, wherein the thermosetting composition further comprises at least one fibrous reinforcement.

15. A method of making a thermoset product comprising: combining (a) at least a first thermosetting resin comprising an epoxy resin; (b) at least one silicone polyether, wherein the silicone polyether comprises the following structure:

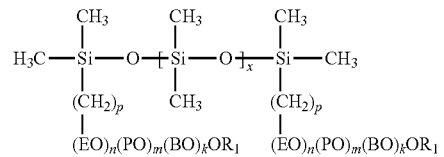

wherein x, p, k, m, and n are independent integers; x is greater than or equal to 1; p is greater than or equal to 1; k, n, and m are greater than or equal to 0 and the sum of k+n+m is greater than or equal to 1; $R_1$ is an independent end group chosen from H, $(CH_2)_rCH_3$ where r is an integer greater than or equal to 0, and (meth)acrylate, wherein the (meth)acrylate is $C(O)CH=CH_2$ or $C(O)C(CH_3)=CH_2$; and EO is ethylene oxide, PO is propylene oxide, and BO is butylene oxide; (c) at least one hardener for the at least one thermosetting resin; and (d) optionally a filler to provide a thermosetting composition;

and curing the thermosetting composition to form the thermoset product.

* * * * *